United States Patent Office 3,514,261
Patented May 26, 1970

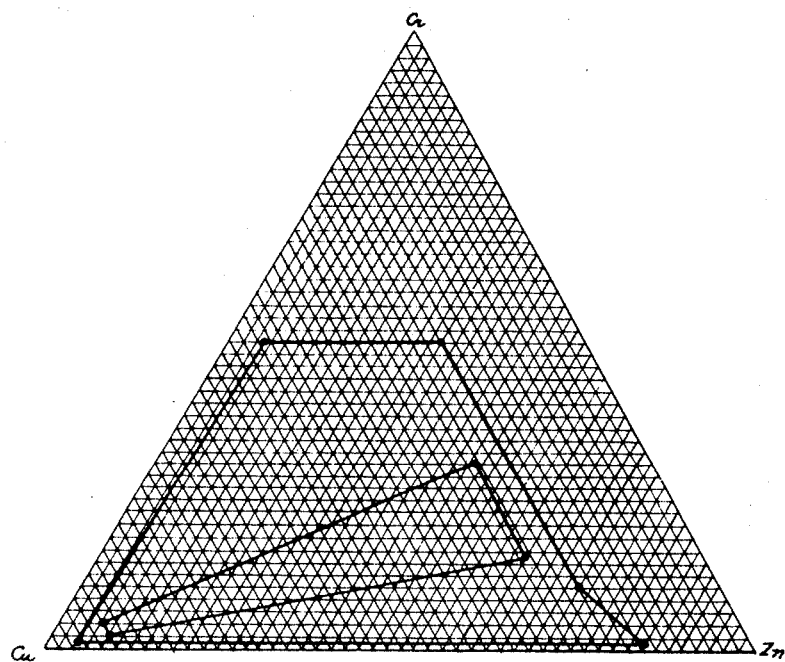

3,514,261
PROCESS FOR PRODUCING CARBON DIOXIDE AND HYDROGEN FROM CARBON MONOXIDE AND STEAM USING MIXED OXIDES OF COPPER, ZINC AND CHROMIUM AS CATALYST AND PROCESS FOR PRODUCING SAID CATALYST
George Walter Bridger, David Owen Hughes, and Philip William Young, Norton-on-Tees, England, assignors to Imperial Chemical Industries Limited, London, England, a corporation of Great Britain
Continuation of application Ser. No. 284,860, June 3, 1963. This application June 3, 1968, Ser. No. 738,372
Claims priority, application Great Britain, Aug. 24, 1962, 32,617/62
Int. Cl. C01b *1/03;* B01j *11/00, 11/32*
U.S. Cl. 23—213                                    12 Claims

ABSTRACT OF THE DISCLOSURE

Process of producing carbon dioxide and hydrogen by reacting carbon monoxide with steam in the presence of a catalyst comprising the product obtained by reducing the mixed oxides of copper, zinc and chromium.

---

This application is a continuation of Ser. No. 284,860 filed June 3, 1963, now abandoned.

This invention relates to a process for producing carbon dioxide and hydrogen by reacting carbon monoxide with steam in the presence of a catalyst, and to an improved method for making catalysts for use in this and other processes.

According to the invention there is provided a process of producing carbon dioxide and hydrogen which comprises reacting carbon monoxide with steam in the presence of a catalyst comprising the product of partly reducing the mixed oxides of copper, zinc and chromium.

This process is advantageous over many known processes of reacting carbon monoxide with steam in that it can be carried out at lower temperatures. Temperatures in the range 100° C.–350° C. are suitable, especially in the range 150° C.–300° C., whereas using conventional ferric oxide-chromium oxide catalyst temperatures of 350° C.–550° C. are often necessary. The process can be operated however at higher temperatures, for example up to 600° C., if desired.

The process may be carried out at pressures over a wide range, conveniently in the range up to 50 atmospheres. Thus for example it may be carried out at slightly superatmospheric pressure in decreasing the carbon monoxide content of domestic heating gas and also at higher pressures for example 10 to 15 atmospheres as in the carbon monoxide-steam reaction in the industrial production of hydrogen.

The process may be carried out at space velocities over a wide range. For example at 250° C. it may be carried out at useful conversions at space velocities of up to 100,000, for example 62,500 hr.$^{-1}$. At lower space velocities, for example up to 20,000 hr.$^{-1}$, for example 2,800 hr.$^{-1}$, the reaction proceeds substantially to equilibrium at convenient temperatures in the range defined above. Thus the process is valuable for further decreasing the carbon monoxide content of a gas mixture which has already been subject to a conventional water-gas shift catalyst at a higher temperature.

The ratio of steam to carbon monoxide in the inlet gas to the process of the invention depends on the extent of reaction required and on the concentration of the product gases hydrogen and carbon dioxide already present. In treating industrial gases containing carbon monoxide and also one or more of those product gases it is convenient to use an excess of steam in order to increase the extent of the desired reaction. Owing however to the fact that at equilibrium the reaction mixture $$CO + H_2O \rightleftharpoons CO_2 + H_2$$

contains more $CO_2$ and $H_2$ the lower the temperature, the excess of steam required for a given conversion in the process of the invention is less than in older processes at higher temperatures. Likewise using the process of the invention it is possible to attain very low carbon monoxide contents with convenient proportions of steam in the inlet gas.

The inlet gas mixture should preferably be substantially sulphur-free, that is contain sulphur or sulphur compounds to the extent of less than about 10 parts per million calculated as sulphur. It is preferred to have present less than 5 parts per million and more preferably less than 1 part per million. Inlet gas mixtures of such low sulphur contents are produced readily by modern desulphurisation techniques, for example as described in U.K. Patent specification No. 902,148. Very suitable inlet gas mixtures for treatment by the process of the invention are those produced by the catalysed reaction of steam with desulphurised hydrocarbons. The above sulphur contents are by weight.

The catalyst for the reaction of carbon oxides with hydrogen contains copper, zinc and chromium preferably in a ratio falling within the area substantially defined by perimeter C passing through the following points on the triangular phase diagram:

| Cu | Zn | Cr |
|----|----|----|
| 95 | 4  | 1  |
| 15 | 84 | 1  |
| 20 | 70 | 10 |
| 20 | 30 | 50 |
| 45 | 5  | 50 | and especially by a perimeter lying within perimeter C and passing through the points

| Cu | Zn | Cr |
|----|----|----|
| 90 | 8  | 2  |
| 25 | 60 | 15 |
| 25 | 45 | 30 |
| 90 | 6  | 4  |

The above perimeters are illustrated in the triangular phase diagram shown in the accompanying drawing.

In the diagram the compositions represented are atomic percentages of the total content of copper, zinc and chromium. Where herein reference is made to a percentage copper, zinc or chromium content such a content is a percentage by atoms of the total copper, zinc and chromium. The preferred catalysts thus have a zinc to chromium ratio in the range 1.5:1 to 4:1 and a copper content in the range 25%–90%. The copper content of such catalysts is more preferably in the range 45%–85%, especially 55%–75%. Thus as examples of valuable catalysts for use in the process of the invention there may be mentioned those consisting of the product of reducing the mixed oxides of copper, zinc and chromium in the atomic ratio 30:60:10, 40:40:20, 80:15:5 and 72:21:7 in increasing order of preference: catalysts having the ratio 60:30:10 and 75:18:7 are similar to the 72:21:7 catalyst.

The catalysts may contain support materials, diluents or binding materials, of types well known in catalyst-making. These however do not appear to be essential, very satisfactory results being obtained without them. We have also found an improved method for making such catalysts: accordingly the invention provides a method of producing a catalyst which comprises co-precipitating from solution copper, zinc and chromium as one or more compounds readily convertible to oxides, under such conditions that at the end of the co-precipitation stage at most a minor part of the precipitated copper compound has decomposed.

The nature of the decomposition of the copper compound is illustrated by the following description. When a solution of the mixed nitrates of copper, zinc and chromium is added to a solution of sodium carbonate a precipitate is formed which initially is flocculent and of a royal blue colour. The precipitate rapidly changes to the pale bluish or greenish condition which is characteristic of the above-mentioned compound, then to a khaki colour which may darken further. The change to the khaki colour and thence to darker colours is the result of decomposition which is to be avoided in the process of the invention. It is believed that copper oxide is one of the products of this decomposition and that it is especially important to avoid the formation of copper oxide during the co-precipitation stage.

The co-precipitation is preferably carried out in the presence of an excess of the acid radical of the compound readily convertible to an oxide. Thus if a batchwise method is employed the solution of the copper, zinc and chromium is preferably added to the solution of that acid radical.

Conditions tending to decrease decomposition of the copper compound appear to include the following:

(a) low temperature for example room temperature; and
(b) short time of contact of the copper compound with alkaline solutions especially at pH values above about 9.5.

The invention includes methods embodying either of these conditions but it is preferred to use condition (b) while keeping the temperature relatively high, for example, at between 80° C. and boiling point.

Conditions (b), the short time of contact of the copper compound with alkaline solutions is of especial importance when the compound is a salt of a weak acid, for example a hydroxide or carbonate, and is formed by adding the copper salt, without or with the zinc and/or chromium salts to an alkali metal hydroxide or carbonate. The short times of contact with the alkaline solution may be achieved for example by adding the copper salt, without or with the zinc and/or chromium salt, to a vessel and at the same time adding the alkaline solution at such a rate that the alkali concentration is continuously and rapidly reduced to a low level, corresponding to a pH less than 9.5 preferably less than about 8 for example between 7.5 and 8.0. (The pH values quoted here and elsewhere in this specification are measured at room temperature.) As an alternative the two solutions may be mixed at a flowing junction, the relative rates of flow being adjusted as for simultaneous addition to a vessel.

By making the catalyst by the method of the invention it is found possible to increase the proportion of copper to zinc and chromium in the catalyst in such a way that the activity of the catalyst, for example in the carbon monoxide-steam reaction and in the methanol synthesis reaction, is increased. When the attempt is made to make catalysts of high copper proportion that is in which the atomic ratio of copper to zinc+chromium is at least 1:1, for example containing 60% of copper by atom, without taking precautions to prevent the above-mentioned decomposition of the copper compound the resulting catalysts are somewhat inhomogeneous and are no more active than catalysts of a considerably lower copper proportion. The method of the feature of the invention may also be used to make a catalyst of lower copper proportion, for example 30% by atoms of the total copper+zinc+chromium content.

The water-insoluble compound readily convertible to oxide may be for example a hydroxide, carbonate or oxalate or a compound or mixture of two or more of these, for example a basic carbonate.

The solution forming the precipitate by reaction with the copper, zinc and chromium salts is preferably of an alkali metal compound. Ammonium compounds can be used but are less preferably. The acid radical of this solution may be for example hydroxide, carbonate, bicarbonate or oxalate or a mixture thereof. Conveniently it is carbonate; the precipitate is then a mixture of carbonates, basic carbonates and hydroxides. Conveniently sodium or potassium carbonates are used.

After the co-precipitation stage the precipitate should be to a large extent freed of electrolytes, for example by washing. Suitably the electrolyte content, calculated as sodium oxide equivalent, is less than 1.0%, especially less than 0.1% by weight of the dry solids present. (By "dry solids" is meant solids stable at 900° C.) The removal of the electrolytes is made easier if the precipitates and mother liquor are heated to a temperature higher than the precipitation temperature, before being separated. After this heating stage but before separation a final adjustment of pH may be made if desired. Alternatively or additionally the separated precipitate may be heated with one or more changes of washing water. These wet heating stages should be carried out with care otherwise the activity of the catalyst may be decreased to some extent.

The copper, zinc and chromium salts are preferably acetates or nitrates, especially nitrates: halides and sulphates should preferably not be present at the co-precipitation stage. The copper salt is preferably cupric.

After being washed the precipitate is dried, conveniently at such a temperature for example 105° C.–150° C. that not more than half the total copper compound present is converted to copper oxide. The dried material is calcined at for example 200° C.–300° C. to convert it at least partly to the mixed oxides.

The calcined material may be ground finely for use in a fluid-bed reaction or may be formed into pieces by for example pelleting under pressure using graphite as lubricant. It may also be granulated or extruded and binding agents may also be added.

Before the oxide mixture can show its full activity as a catalyst it should be partly reduced. This may be conveniently effected by passing a reducing gas for example hydrogen or carbon monoxide, preferably diluted with an inert gas such as nitrogen or steam, at atmospheric pressure over the oxide mixture at temperature preferably in the range 120° C.–250° C. When the inlet gases of the process which the catalyst is to catalyse have reducing properties the reduction of the oxide mixture may be effected by these gases preferably suitably diluted in the plant in which the process is to be carried out.

The catalysts made by the method of the invention are highly valuable for the reaction of carbon monoxide with steam, for the synthesis of oxygenated hydrocarbons especially methanol from carbon oxides and hydrogen, especially as described in U.S. application Ser. No. 284,861, filed on even date herewith and issued as U.S. Pat. 3,326,956 on June 20, 1967 in the name of Phineas Davies and Frederick Forster Snowdon, and for organic hydrogenation and dehydrogenation reactions at temperatures up to about 300° C.

The invention is illustrated by the following examples.

EXAMPLE 1

A catalyst consisting of the reduction product of the mixed oxides of copper, zinc and chromium in the ratio 60:30:10 by atoms was made as follows:

A solution of 9.084 kg. of copper nitrate $$Cu(NO_3)_2 \cdot 3H_2O$$

5.592 kg. of zinc nitrate $Zn(NO_3)_2 \cdot 6H_2O$ and 2.508 kg. of chromium nitrate $Cr(NO_3)_3 \cdot 9H_2O$ dissolved in 100 litres of water was heated to 90° C. and added over 2 minutes with stirring to a solution of 7.674 kg. of sodium carbonate $Na_2CO_3$ in 150 litres of water also at 90° C. The pH of the final mixture measured on a sample at room temperature was 8.0. The colour of the precipitate was a pale green-blue showing that little if any decomposition had taken place. The mixture was stirred for 15 minutes at 90° C., during which no change in colour took place. It was then filtered and washed by passing cold water through the residue until the sodium content of the residue as shown by gravimetric analysis after drying at 900° C. was 0.05% by weight as $Na_2O$. The residue was then dried in air at 105° C., during which treatment no change in colour took place, then calcined in air at 265° C. for 4 hours. The resulting product, which has hereinbefore been referred to as the mixed oxides, was a dark brown solid. It was pelleted under pressure to produce 3/16" by 3/16" cylindrical pellets, and subjected to a reduction stage just before use, by passing over it a mixture of hydrogen and nitrogen at atmospheric pressure until no further heat of reaction could be detected: the final temperature during reduction was 220° C.–250° C.

The use in methanol synthesis of the above catalyst and of a catalyst having the composition copper 75:zinc 18:chromium 7 made in the same way but with appropriate adjustment of the quantities of the starting materials, is described in the abovementioned U.S. at. 3,326,956 issued on the copending Davies et al. application Ser No. 284,861.

EXAMPLE 2

In a small-scale test of the catalyst of Example 1 a 2.5 g. sample of the pelleted mixed oxides was crushed to pass a 7–10 B.S.S. (British Standard Sieve) mesh, then reduced as described already. Then a mixture of 25% carbon monoxide, 25% hydrogen and 50% steam (percentages by volume) was passed over the catalyst at substantially atmospheric pressure, a space velocity of 62,500 hour$^{-1}$ and temperature in the range 150° C.–250° C. The table shows the carbon monoxide contents of the dry inlet gas and dry heated gas, in comparison with results obtained (a) using a copper-zinc-chromium catalyst made without precautions to avoid decomposition of the copper precipitate and (b) using a conventional iron oxide-chromium oxide catalyst. (In making catalyst (a) it was observed that the precipitate was of a khaki colour at the end of the co-precipitation stage.)

for 12 hours, with similar results, and the temperature was decreased back to 180° C. No decrease in catalyst activity was observed as the result of the operation at 250° C.; and the activity remained constant during a further 1100 hours at 180° C.

EXAMPLE 4

A pelleted mixed oxide composition was made as described in Example 2 but with the composition $$Cu_{30.8}Zn_{59.7}Cr_{9.5}$$

and with a coprecipitation mixing time of 30 minutes. It was reduced using hydrogen diluted with nitrogen at 160° C.–220° C. There was passed over the resulting catalyst a gas mixture consisting of 6.85% carbon monoxide, 7.65% carbon dioxide, 35.55% hydrogen, 50% steam and 0.65% methane (percentages by volume) at a temperature of 220° C. (inlet) and 280° C. (exit), a pressure of 180 p.s.i.g. and a space velocity of 4,200 hour$^{-1}$. The exit gas contained only 0.25% of carbon monoxide.

In the catalyst used in this example the sodium content was higher, corresponding to 0.3% of $Na_2O$ in the dried but uncalcined precipitate, that is, 0.4% on the mixed oxides as dried at 900° C.

What is claimed is:

1. A process for producing carbon dioxide and hydrogen, which comprises reacting carbon monoxide with steam at a temperature of about 100° C. to about 600° C. in the substantial absence of sulphur and in the presence of a catalyst comprising, as the essential active catalytic material, the product obtained by reducing with hydrogen or carbon monoxide the mixed oxides of copper, zinc and chromium, said catalyst containing copper, zinc, and chromium in a ratio falling within the area defined by the following atomic percentage points on a triangular phase diagram:

| Cu | Zn | Cr |
|---|---|---|
| 95 | 4 | 1 |
| 15 | 84 | 1 |
| 20 | 70 | 10 |
| 20 | 30 | 50 |
| 45 | 5 | 50 |

| | Catalyst | | | | | | | | |
|---|---|---|---|---|---|---|---|---|---|
| | $Cu_{60}Zn_{30}Cr_{10}$ (by the method of the invention) | | | $Cr_{60}Zn_{30}Cr_{10}$ (without precautions) (a) | | | $Fe_2O_3$-$Cr_2O_3$ (conventional) (b) | | |
| Temperature | 150 | 200 | 250 | 150 | 200 | 250 | 350 | 400 | 450 |
| Inlet CO, percent by vol | 50 | 50 | 50 | 50 | 50 | 50 | 50 | 50 | 50 |
| Exit CO, percent by vol | 39.2 | 26.6 | 18.3 | 45.6 | 35.2 | 28.9 | 40.7 | 33.3 | 26.7 |
| Exit $CO_2$, percent by vol | 7.2 | 15.6 | 21.1 | 3.0 | 9.9 | 14.1 | 6.2 | 11.1 | 15.5 |
| Percent conversion | 15.5 | 37.0 | 53.6 | 6.1 | 21.9 | 32.8 | 13.2 | 25.0 | 36.8 |

A catalyst having the composition 75 Cu:18 Zn:7 Cr made by a method similar to that of Example 1, but with appropriate adjustment of the quantities of the starting materials, was tested in the same way. The percentage conversions were:

| | Percent |
|---|---|
| 150° C. | 15 |
| 200° C. | 38 |
| 250° C. | 60 |

EXAMPLE 3

A sample of mixed oxides produced as described in Example 1 was charged to a pilot scale converter (volume 3½ litres) and at 160° C.–220° C. reduced using hydrogen diluted with nitrogen. A gas mixture containing 0.25% carbon monoxide, 12.5% carbon dioxide, 35% hydrogen, 50% steam and fractional percentages of methane and inert gases (percentages by volume) was passed over the catalyst at a temperature of 180° C., a space velocity of 2,800 hour$^{-1}$, and a pressure of 180 p.s.i.g. The carbon monoxide content of the exit gas was found to be only 0.06%. The same process was then operated at 250° C.

the mixed oxides being produced by coprecipitating copper, zinc, and chromium, by mixing an excess of an alkali metal compound selected from the group consisting of hydroxides, carbonates, bicarbonates, oxalates, and mixtures thereof with a solution of copper, zinc, and chromium compounds selected from the group consisting of nitrates and acetates, the pH of the reaction mixture at the end of the coprecipitation being alkaline and below 9.5, whereby the formation of any substantial amount of copper oxide as evidenced by the obtention of a khaki color during the coprecipitation step is prevented and then calcining the coprecipitated product to form said mixed oxides.

2. A process according to claim 1 wherein the reaction temperature is in the range 150° C.–300° C. and the coprecipitation is carried out at a temperature between 80° C. and the boiling point of the solution.

3. A process according to claim 1 wherein the sulphur content of the inlet gas mixture is less than 5 parts per million by weight.

4. A process according to claim 3 wherein the sulphur content of the inlet gas mixture is less than 1 part per million by weight.

5. A process according to claim 1 wherein the pH of the reaction mixture at the end of the coprecipitation is below 8.

6. A process according to claim 1 wherein the precipitate is washed to decrease its electrolyte content calculated as sodium oxide equivalent to less than 1.0% by weight of the dry solids present.

7. A process according to claim 6 wherein the precipitate is washed to decrease its electrolyte content calculated as sodium oxide equivalent to less than 0.1% by weight of the dry solids present.

8. A process as claimed in claim 1 wherein said catalyst contains copper, zinc, and chromium in a ratio falling within the area defined by the following atomic percentage points on a triangular phase diagram:

| Cu | Zn | Cr |
|----|----|----|
| 90 | 8  | 2  |
| 25 | 60 | 15 |
| 25 | 45 | 30 |
| 90 | 6  | 4  |

9. A process for producing a catalyst for the reaction of carbon monoxide with steam at a temperature of about 100° C. to about 600° C., in the substantial absence of sulphur, to produce carbon dioxide and hydrogen, said process comprising: (a) coprecipitating copper, zinc, and chromium in a ratio of copper, zinc, and chromium falling within the area defined by the following atomic percentage points on a triangular phase diagram:

| Cu | Zn | Cr |
|----|----|----|
| 95 | 4  | 1  |
| 15 | 84 | 1  |
| 20 | 70 | 10 |
| 20 | 30 | 50 |
| 45 | 5  | 50 | by mixing an excess of an alkali metal compound selected from the group consisting of hydroxides, carbonates, bicarbonates, oxalates, and mixtures thereof, with a solution consisting essentially of copper, zinc and chromium compounds selected from the nitrates and acetates of said metals, the pH of the reaction mixture at the end of the coprecipitation being alkaline and below 9.5, whereby the formation of substantial amounts of copper oxide as evidenced by the obtention of a khaki color during the coprecipitation step is prevented, (b) calcining the resulting precipitate to obtain said mixed oxides and then (c) reducing the mixed oxides by contacting the same with hydrogen or carbon monoxide to produce said catalyst.

10. The process as claimed in claim 9 wherein said catalyst contains copper, zinc, and chromium in a ratio falling within the area defined by the following atomic percentage points on a triangular phase diagram:

| Cu | Zn | Cr |
|----|----|----|
| 90 | 8  | 2  |
| 25 | 60 | 15 |
| 25 | 45 | 30 |
| 90 | 6  | 4  |

11. The product produced by the process of claim 9.

12. A process according to claim 1 wherein the mixed oxides have an atomic ratio of copper to zinc plus chromium of at least 1:1.

References Cited

UNITED STATES PATENTS

| | | | |
|---|---|---|---|
| 1,797,426 | 3/1931 | Larson | 23—213 |
| 1,809,978 | 6/1931 | Larson | 23—213 |
| 3,074,783 | 1/1963 | Paull | 23—210 XR |
| 1,746,781 | 2/1930 | Lazier | 252—468 |
| 1,959,313 | 5/1934 | Vail | 252—468 X |
| 2,697,730 | 12/1954 | Mecorney et al. | 252—468 X |

FOREIGN PATENTS

| | | |
|---|---|---|
| 636,800 | 5/1950 | Great Britain. |

EDWARD STERN, Primary Examiner

U.S. Cl. X.R.

252—468